US 8,266,371 B2

(12) United States Patent
Toyama

(10) Patent No.: US 8,266,371 B2
(45) Date of Patent: Sep. 11, 2012

(54) NON-VOLATILE STORAGE DEVICE, HOST DEVICE, NON-VOLATILE STORAGE SYSTEM, DATA RECORDING METHOD, AND PROGRAM

(75) Inventor: Masayuki Toyama, Osaka (JP)

(73) Assignee: Panasonic Corporation, Osaka (JP)

( * ) Notice: Subject to any disclaimer, the term of this patent is extended or adjusted under 35 U.S.C. 154(b) by 357 days.

(21) Appl. No.: 12/670,454

(22) PCT Filed: Jul. 28, 2009

(86) PCT No.: PCT/JP2009/003545
§ 371 (c)(1),
(2), (4) Date: Jan. 25, 2010

(87) PCT Pub. No.: WO2010/013445
PCT Pub. Date: Feb. 4, 2010

(65) Prior Publication Data
US 2010/0191901 A1    Jul. 29, 2010

(30) Foreign Application Priority Data

Jul. 30, 2008  (JP) .................................. 2008-196083

(51) Int. Cl.
*G06F 12/00* (2006.01)
(52) U.S. Cl. ................. 711/103; 711/171; 711/E12.008; 711/E12.009
(58) Field of Classification Search .......................... None
See application file for complete search history.

(56) References Cited

U.S. PATENT DOCUMENTS

| 2005/0080985 | A1* | 4/2005 | Sasaki .......................... 711/103 |
| 2006/0004969 | A1 | 1/2006 | Suda |
| 2006/0224819 | A1 | 10/2006 | Ito |
| 2007/0067598 | A1 | 3/2007 | Fujimoto |

FOREIGN PATENT DOCUMENTS

| JP | 2006-018471 A | 1/2006 |
| JP | 2006-178923 A | 7/2006 |
| JP | 2006-285669 A | 10/2006 |
| JP | 2008-010109 A | 1/2008 |
| JP | 2008-117491 A | 5/2008 |
| WO | 2008/018446 A | 2/2008 |

OTHER PUBLICATIONS

International Search Report for corresponding application No. PCT/JP2009/003545 mailed Aug. 25, 2009.

* cited by examiner

*Primary Examiner* — Edward Dudek, Jr.
*Assistant Examiner* — Ralph A Verderamo, III
(74) *Attorney, Agent, or Firm* — Renner, Otto, Boisselle & Sklar, LLP

(57) ABSTRACT

A memory controller, a non-volatile storage device, a host device, and a non-volatile storage system capable of performing real-time recording even in the case where normal data and file management information/auxiliary information are written in alternating manner are provided. The host device (2) issues a memory management command before the start, after the end, or both before and after the start and end of real-time recording. When the non-volatile storage device (1) receives the memory management command, an internal memory controller (11) clears memory control information and performs garbage collection as necessary.

10 Claims, 11 Drawing Sheets

| CMD | Starting Bit | Identifier | Argument | CRC | Ending Bit |

| RES | Starting Bit | Identifier | Status | CRC | Ending Bit |

| DAT | Starting Bit | Payload | CRC | Ending Bit |

FIG. 3

| Starting Bit | Identifier A | Stuff Bits | | CRC | Ending Bit |
|---|---|---|---|---|---|
| | | | Start/End | | |
| Starting Bit | Identifier B | Stuff Bits | Memory Control Information Clear | CRC | Ending Bit |
| Starting Bit | Identifier C | Stuff Bits | Garbage Collection | CRC | Ending Bit |
| Starting Bit | Identifier D | Stuff Bits | Added Information Recording ON/OFF | CRC | Ending Bit |

(a)

| Starting Bit | Identifier E | Stuff Bits | Garbage Collection | Memory Control Information Clear | Start/End | CRC | Ending Bit |
|---|---|---|---|---|---|---|---|
| Starting Bit | Identifier F | Stuff Bits | Garbage Collection | Added Information Recording ON/OFF | Start/End | CRC | Ending Bit |

(b)

| Starting Bit | Identifier G | Stuff Bits | CRC | Ending Bit |
|---|---|---|---|---|

| MNG1 | | | |
|---|---|---|---|
| XXXX | | | |
| | | | |
| | | | XXXX |

| Data Type | Logical Address (LBA) | Physical Address (PBA) | Other Management Information |
|---|---|---|---|

FIG. 9

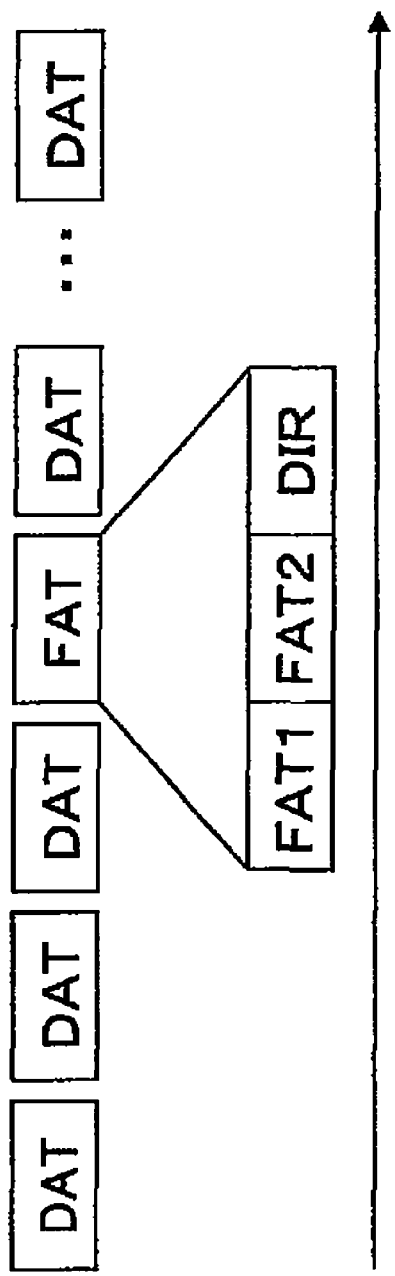
FIG. 11
(Conventional)

NON-VOLATILE STORAGE DEVICE, HOST DEVICE, NON-VOLATILE STORAGE SYSTEM, DATA RECORDING METHOD, AND PROGRAM

TECHNICAL FIELD

The present invention relates to a memory controller that writes data to and reads data from a non-volatile memory, a non-volatile storage device (memory device) provided with the memory controller and a non-volatile memory, a host device, connected to the non-volatile storage device, that writes data to and reads data from the non-volatile memory, and a non-volatile storage system (memory system) configured including the host device and the memory device. The present invention also relates to a data storage method and program used in a non-volatile storage system.

BACKGROUND ART

Non-volatile memories, such as NAND flash memories, are frequently used as storage devices for holding digital information in devices that control digital information, such as digital cameras, video cameras, and cellular phones (called "host devices" hereinafter). In recent years, the frequency at which the specifications of non-volatile memories are changed due to the scaling down of semiconductor processes has increased, and therefore memory devices that include a non-volatile memory and a memory controller are being used more widely. Such memory devices include removable cards that can be attached to and removed from the host device, embedded types that are attached to the circuit board of the host device and used, and so on.

Recently, the capacities of internal non-volatile memories are increasing, and non-volatile memories are being more widely applied to moving picture recording applications. When recording a moving picture into a device that includes a non-volatile memory, what is known as real-time recording, where data is written while ensuring a constant write speed, is necessary. Patent Citation 1 discloses a method for carrying out real-time recording into a memory device that uses such a non-volatile memory.

When a host device performs real-time recording into a memory device, in actuality, normal data (data excluding special data such as management information; for example, data of which user files are composed, still image data, moving picture data, and so on correspond to "normal data") and file management information are recorded in an alternating manner.

FIG. 11 indicates the writing sequence of data and file management information according to a conventional technique.

As indicated in FIG. 11, in the conventional technique, the writing process of normal data DAT and the writing process of file management information FAT are carried out in an alternating manner. The file management information FAT is, for example, file management information according to the FAT file system; the writing process of the file management information FAT is composed of a writing process for duplicated file allocation tables FAT1 and FAT2 and the writing process of a directory entry DIR. With a memory device according to the conventional technique, the writing process of the normal data DAT and the writing process of the file management information FAT (FAT1, FAT2, DIR) are performed so that data/information is identified based on its address, size, and sequence and recorded into different regions within the non-volatile memory, so that the writing of the file management information does not affect the performance of the writing of the normal data.
Patent Citation 1: Patent JP2006-178923A

SUMMARY OF THE INVENTION

Technical Problem

However, the aforementioned conventional technique has the following problems. That is, because the file management information and normal data are written into the non-volatile memory using the same write commands, the proper data management within the non-volatile memory cannot be carried out if the memory device erroneously determines the data type. For this reason, the aforementioned conventional technique has a problem in that the performance of normal data writing is affected.

In addition, as the increase in the capacities of non-volatile memories progresses further, it can be assumed that additional management information for efficiently accessing recorded files (called "auxiliary information" hereinafter) will be written. Management information for managing sequentially-recorded area for quickly accessing data in specific locations (for example, a specific playback time) within a moving picture file of several GB can be given as an example of such auxiliary information.

However, because whether or not to record auxiliary information depends on the host device, a case such as where, for example, after a memory device is connected to a certain host device A and real-time recording is carried out with "auxiliary information recorded", the memory device is then connected to a different host device B and real-time recording is carried out with "no auxiliary information recorded". In a case such as this, the host device B may write normal data into the memory region, in the non-volatile memory of the memory device recorded into by the host device A, in which the auxiliary information was recorded. In this case, because normal data is written into a memory region identified by the memory device as being a region for recording auxiliary information, the proper data management cannot be carried out in the non-volatile memory, leading to a drop in the performance of normal data writing and, in a worst-case scenario, the possibility that the recording process stops during recording operations.

It is an object of the present invention to provide a memory controller, memory device, host device, and memory system that solve the aforementioned problems and are capable of carrying out real-time recording (a data writing process that ensures a constant write speed) even in the case where a writing process for normal data and a writing process for file management information and auxiliary information are carried out in an alternating manner.

Technical Solution

A first aspect of the invention is a non-volatile storage device, communicably connected to a host device, that writes data and/or reads out data in accordance with a command from the host device, the non-volatile storage device including a nonvolatile memory, a memory control information holding unit, an address management unit, and a memory control unit.

The memory control information holding unit holds memory control information managing the data type of data written into the non-volatile memory. The address management unit is operable to register, update, and clear the memory control information held by the memory control information holding unit. When a memory management command issued by the host device instructing the start of real-time recording, the real-time recording being a data writing process that ensures a constant writing speed, is received, the memory control unit identifies the data to be continuously written by the host device into the non-volatile storage device as a first data type at least from the time when the memory management command was received to the time when the real-time recording ends, and identifies the data written into the same region within a logical address space managed by the host device as a second data type.

With this non-volatile storage device, when a memory management command issued by the host device instructing the start of real-time recording is received, the data to be continuously written by the host device into the non-volatile storage device at least from the time when the memory management command was received to the time when the real-time recording ends is identified by the memory control unit as a first data type, and the data written into the same region within a logical address space managed by the host device is identified by the memory control unit as a second data type. Therefore, with this non-volatile storage device, writing into the non-volatile memory can be properly controlled through the proper use of the identified data.

Note that "data to be continuously written" refers to, for example, data for which an efficient data writing process can be executed by carrying out writing processes from the host device into the non-volatile storage device continuously, as with moving picture data.

Meanwhile, "data written into the same region" refers to data (information) whose write destination address (logical address) in the logical address space is uniquely determined, and, for example, FAT (file allocation tables) as defined by the FAT file system, DIR (directory entries) as defined by the FAT file system, and so on correspond to this. Note that this "data written into the same region" is overwritten repeatedly into a predetermined logical address with high frequency. This trend is particularly evident during the real-time recording process.

A second aspect of the invention is the first aspect of the invention, in which the memory control unit records data of the first data type into a first memory region within the non-volatile memory, and records data of the second data type into a second memory region within the non-volatile memory, the second memory region being a different region than the first memory region.

With this non-volatile storage device, when a memory management command instructing the start of real-time recording is issued by the host device and received, the data to be continuously written by the host device into the non-volatile storage device at least from the time when the memory management command was received to the time when the real-time recording ends is identified by the memory control unit as a first data type, and the data written into the same region within a logical address space managed by the host device is identified by the memory control unit as a second data type. Therefore, with this non-volatile storage device, the writing into the non-volatile memory can be properly controlled, without data or information of differing data types being written into a predetermined region of the non-volatile memory in a mixed state. As a result, with this non-volatile storage device, it is possible to prevent a drop in performance caused by mistaken identifications/mismatches of data types, therefore making stable real-time recording possible.

A third aspect of the invention is the first or second aspect of the invention, in which when a memory management command issued by the host device and instructing the start of real-time recording has been received, the memory control unit performs a garbage collection process on the non-volatile memory based on the memory control information and/or clears the memory control information.

With this non-volatile storage device, when a memory management command instructing the start of real-time recording is received, a garbage collection process is performed on the non-volatile memory based on the memory control information and/or the memory control information is cleared; therefore, the real-time recording can be executed after putting the non-volatile storage device into a state suitable for real-time recording. For this reason, with this non-volatile storage device, stable real-time recording can be executed.

A fourth aspect of the invention is one of the first through third aspects of the invention, in which the memory control unit identifies file data as the first data type and identifies file management information as the second data type.

A fifth aspect of the invention is the fourth aspect of the invention, in which the memory control unit identifies directory entries and/or auxiliary information as the second data type.

A sixth aspect of the invention is one of the first through fifth aspects of the invention, in which the memory control unit identifies the data type by the write address of the data.

A seventh aspect of the invention is one of the first through fifth aspects of the invention, in which the memory control unit identifies the data type by the size of the written data.

An eighth aspect of the invention is one of the first through seventh aspects of the invention, in which upon receiving the memory management command, the address management unit clears all the memory control information held by the memory control information holding unit.

A ninth aspect of the invention is one of the first through seventh aspects of the invention, in which upon receiving the memory management command, the address management unit clears first memory control information held by the memory control information holding unit.

A tenth aspect of the invention is one of the first through seventh aspects of the invention, in which upon receiving the memory management command, the address management unit clears second memory control information held by the memory control information holding unit.

An eleventh aspect of the invention is one of the first through seventh aspects of the invention, in which upon receiving the memory management command, the memory control unit performs a garbage collection process for the non-volatile memory.

A twelfth aspect of the invention is one of the first through eleventh aspects of the invention, in which the memory management command contains an argument, and the argument of the memory management command contains a flag indicating the start of real-time writing.

A thirteenth aspect of the invention is one of the first through eleventh aspects of the invention, in which the argument of the memory management command contains a flag instructing the memory control information to be cleared.

A fourteenth aspect of the invention is one of the first through eleventh aspects of the invention, in which the argument of the memory management command contains a flag indicating the presence/absence of writing auxiliary information.

A fifteenth aspect of the invention is one of the first through fourteenth aspects of the invention, in which when the memory management command is received, a busy signal is communicated to the host device until processing in the non-volatile storage device has ended.

Note that "processing in the non-volatile storage device" refers to processing for putting the non-volatile storage device into a state where it is capable of real-time recording, and is, for example, a garbage collection process performed on the non-volatile memory and/or a process for clearing the memory control information.

A sixteenth aspect of the invention is one of the first through fifteenth aspects of the invention, in which the non-volatile storage device is a removable memory that can be attached to/removed from the host device.

A seventeenth aspect of the invention is a host device, communicably connected to the non-volatile storage device according to one of the first through sixteenth aspects of the invention, that exchanges commands, responses, and data with the non-volatile storage device, the host device writing, into the non-volatile storage device, data of a first data type that is written continuously into the non-volatile storage device and data of a second data type that is written into the same region in a logical address space managed by the host device while ensuring a constant write speed. This host device includes a host control unit that issues, to the non-volatile storage device, a memory management command for setting the non-volatile storage device into a real-time recordable state prior to the start of real-time recording.

With this host device, a memory management command is issued to the non-volatile storage device, and therefore the non-volatile storage device can be put into a state where it is capable of real-time recording prior to the start of real-time recording. As a result, with this host device, stable real-time recording into the non-volatile storage device can be achieved.

An eighteenth aspect of the invention is the seventeenth aspect of the invention, in which the host control unit issues the memory management command to the non-volatile storage device when the real-time recording ends.

A nineteenth aspect of the invention is one of the seventeenth through eighteenth aspects of the invention, in which the second data type contains directory entries and/or auxiliary information.

A twentieth aspect of the invention is the nineteenth aspect of the invention, in which during the period in which the real-time recording process is being executed, the host control unit issues, to the non-volatile storage device, a command indicating that the data to be written into the non-volatile storage device is directory entries and/or auxiliary information among the second data type.

Accordingly, with this host device, a command indicating that the data to be written thereafter is a directory entry and/or auxiliary information can be issued to the memory device prior to the process for writing the directory entry and/or the auxiliary information being executed.

A twenty-first aspect of the invention is a nonvolatile storage system including the nonvolatile storage device according to one of the first through sixteenth aspects of the invention and a host device according to one of the seventeenth through twentieth aspects of the invention.

A twenty-second aspect of the invention is a data recording method used in a non-volatile storage device, communicably connected to a host device, that writes data and/or reads out data in accordance with a command from the host device, the non-volatile storage device including a non-volatile memory, a memory control information holding unit that holds memory control information managing the data type of data written into the non-volatile memory, and an address management unit operable to register, update, and clear the memory control information held by the memory control information holding unit. This data recording method includes a data identification step and a recording step.

In the data identification step, when a memory management command issued by the host device instructing the start of real-time recording, the real-time recording being a data writing process that ensures a constant writing speed, is received, the data to be continuously written by the host device into the non-volatile storage device at least from the time when the memory management command was received to the time when the real-time recording ends is identified as a first data type, and the data written into the same region within a logical address space managed by the host device is identified as a second data type. In the recording step, data of the first data type is recorded into a first memory region within the non-volatile memory, and data of the second data type is recorded into a second memory region within the non-volatile memory, the second memory region being a different region than the first memory region.

Through this, it is possible to achieve a data recording method that achieves the same effects as the second aspect of the invention.

A twenty-third aspect of the invention is a computer program for causing a computer to execute a data recording method used in a non-volatile storage device, communicably connected to a host device, that writes data and/or reads out data in accordance with a command from the host device, the non-volatile storage device including a non-volatile memory, a memory control information holding unit that holds memory control information managing the data type of data written into the non-volatile memory, and an address management unit operable to register, update, and clear the memory control information held by the memory control information holding unit. This data recording method includes a data identification step and a recording step.

In the data identification step, when a memory management command issued by the host device instructing the start of real-time recording, the real-time recording being a data writing process that ensures a constant writing speed, is received, the data to be continuously written by the host device into the non-volatile storage device at least from the time when the memory management command was received to the time when the real-time recording ends is identified as a first data type, and the data written into the same region within a logical address space managed by the host device is identified as a second data type. In the recording step, data of the first data type is recorded into a first memory region within the non-volatile memory, and data of the second data type is recorded into a second memory region within the non-volatile memory, the second memory region being a different region than the first memory region.

Thus, it is possible to achieve a program that causes a computer to execute a data recording method that achieves the same effects as the second aspect of the invention.

Advantageous Effects

According to the memory controller, memory device (non-volatile storage device), host device, and memory system (non-volatile storage system) of the present invention, the host device issues a memory management command to the memory device before the beginning, after the end, or both before the beginning and after the end of real-time recording, and when the memory device receives the memory management command, the memory controller clears one or both of the first memory control information and the second memory control information and performs garbage collection as necessary, thereby setting a state in which real-time recording is possible.

Through this, with the non-volatile storage system, the memory controller can register new memory control information in the memory control information holding unit based on the data type with each writing process, even in the case where real-time recording is performed and a writing process for normal data and a writing process for file management information and auxiliary information are carried out in an alternating manner. As a result, with the non-volatile storage system, data or information of different data types are not written into predetermined regions of the non-volatile memory in a mixed state, thereby making it possible to properly control writes into the non-volatile memory.

Therefore, according to the present invention, it is possible to prevent a drop in performance caused by mistaken identifications/mismatches of data types, thus making stable real-time recording possible.

BRIEF DESCRIPTION OF DRAWINGS

FIG. 3 is a diagram illustrating the structure of CMD, RES, and DAT.

FIG. 4 is a diagram illustrating the structure of a memory management command.

FIG. 9 is a diagram illustrating the structure of memory control information.

FIG. 11 is a diagram illustrating a sequence of real-time recording according to a conventional technique.

BEST MODE FOR CARRYING OUT THE INVENTION

Embodiments of the present invention will be described hereinafter with reference to the drawings.

First Embodiment 1.1: Configuration of Non-Volatile Storage System

Figure 1:
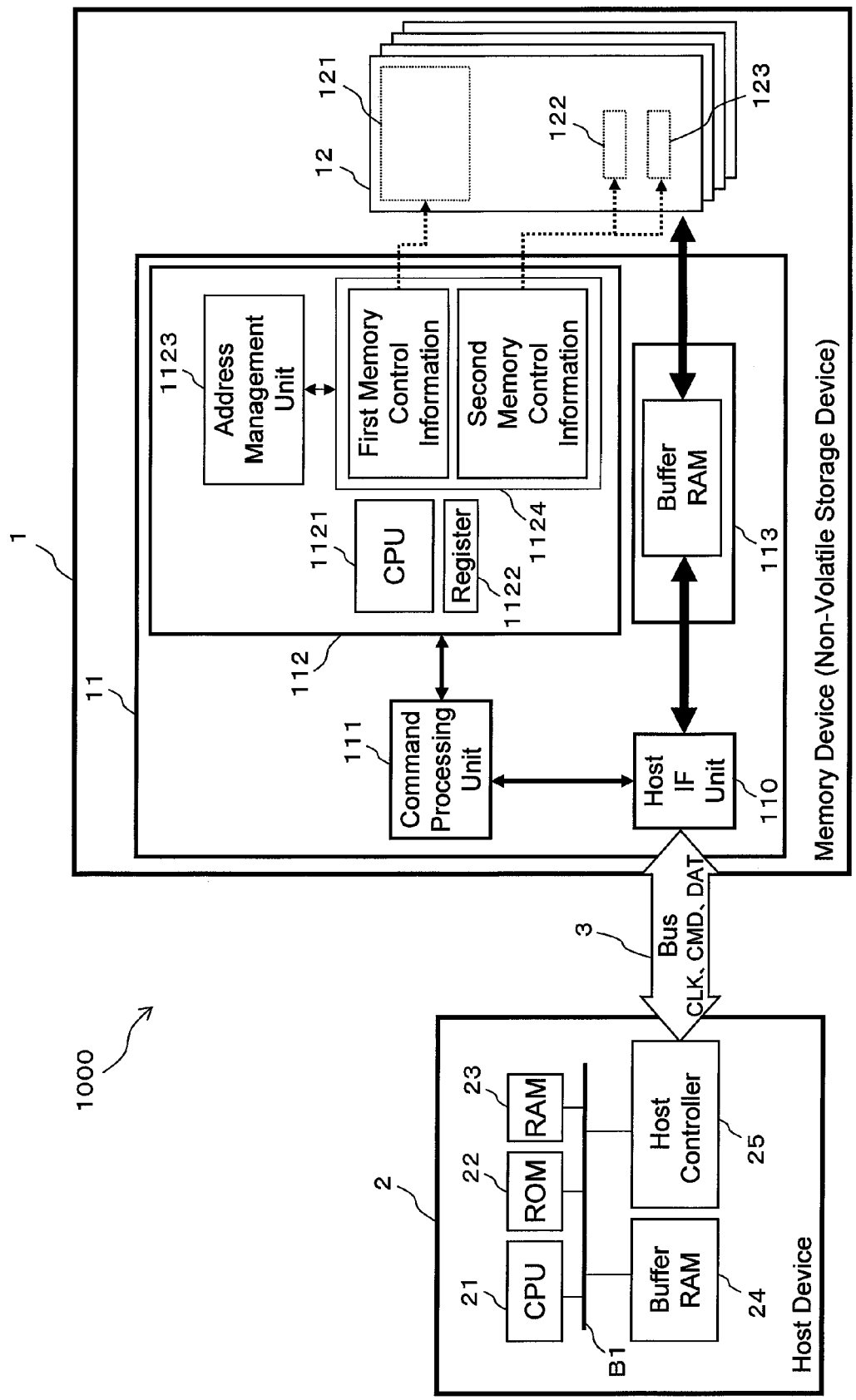
FIG. 1 is a block diagram of a non-volatile storage system (memory system) 1000 according to a first embodiment.

FIG. 1 is a block diagram illustrating the configuration of a non-volatile storage system (memory system) 1000 according to a first embodiment of the present invention.

As illustrated in FIG. 1, the non-volatile storage system 1000 includes a memory device (non-volatile storage device) 1 and a host device 2; the memory device 1 and host device are connected via a bus 3.

(1.1.1: Memory Device)

As shown in FIG. 1, the memory device 1 includes a memory controller 11 and at least one non-volatile memory 12.

The memory controller 11 includes, as shown in FIG. 1, a host IF unit 110, a command processing unit 111, a memory control unit 112, and a data control unit 113.

The host IF unit 110 is connected to the host device 2 via the bus 3, and is capable of communicating with the host device 2. The host IF unit 110 receives commands from the host device 2, sends responses to the host device 2, and so on via the bus 3. The host IF unit 110 also exchanges data with the host device 2 via the bus 3. In addition, the host IF unit 110 outputs commands received from the host device 2 to the command processing unit 111, and outputs data received from the host device 2 to the data control unit 113. Furthermore, the host IF unit 110 is inputted with responses and so on outputted from the command processing unit 111, and sends those responses and so on (host IF unit 110, response) to the host device 2 via the bus 3.

The command processing unit 111 interprets commands issued by the host device 2 and received by the host IF unit 110, generates responses to be returned to the host device 2, and outputs those responses to the host IF unit 110. In addition, the command processing unit 111 outputs, to the memory control unit 112, command interpretation results, data obtained from command arguments, and so on.

The memory control unit 112 inputs and outputs data to and from the non-volatile memory 12, performs memory region management for the non-volatile memory 12, and so on.

The memory control unit 112 includes a CPU 1121 that controls the overall processing of the memory device 1; a register 1122 that holds control information; an address management unit 1123 that manages the correspondence between logical addresses contained in the commands issued by the host device 2 and physical addresses within the non-volatile memory 12; and a memory control information holding unit 1124 that holds memory control information for managing the type, writing region, and so on of data written into a region 121 within the non-volatile memory 12.

The memory control information holding unit 1124 contains first memory control information for managing the region 121 within the non-volatile memory 12 into which data of a first type has been written, and second memory control information for managing regions 122 and 123 into which data of a second type has been written. Note that the number of regions managed using the first memory control information and the second memory control information are arbitrary numbers greater than or equal to 1, and are not intended to be limited to the numbers shown in FIG. 1.

The data control unit 113 includes a buffer RAM for inputting and outputting data between the host IF unit 110 and the non-volatile memory 12; the data control unit 113 uses this buffer RAM to carry out processes for writing/reading data to/from the non-volatile memory 12 in accordance with instructions from the memory control unit 112.

Note that all or some of the various functional units of the memory controller 11 may be connected individually, or may be connected using an internal bus.

(1.1.2: Host Device)

The host device 2 includes, as shown in FIG. 1, a CPU 21 that performs overall control of the host device 2, a ROM 22, a RAM 23, a buffer RAM 24 for exchanging data with the memory device 1, and a host controller 25 that exchanges commands/responses, data, and so on with the memory device 1 via the bus 3.

Note that all or some of the various functional units of the host device 2 may be connected individually, or may be connected using an internal bus (for example, the bus B1 shown in FIG. 1).

In addition, the functions of a host control unit are achieved by the CPU 21, the ROM 22, the RAM 23, the buffer RAM 24, and the host controller 25.

(1.1.3: Bus)

The bus 3 is configured, for example, of a group of one or more signal lines for the memory device 1 and the host device 2 to exchange commands/responses, data, and so on. In the non-volatile storage system 1000 according to the present embodiment, the bus 3 is configured so as to include a clock line for transmitting a clock signal CLK, a command line for transmitting a command/response signal CMD, and a data signal line for transmitting a data signal DAT. Note that the data signal line of the bus 3 does not necessarily have to be a single line, and the bus 3 may contain multiple data signal lines.

<<Bus Transactions>>

Figure 2:
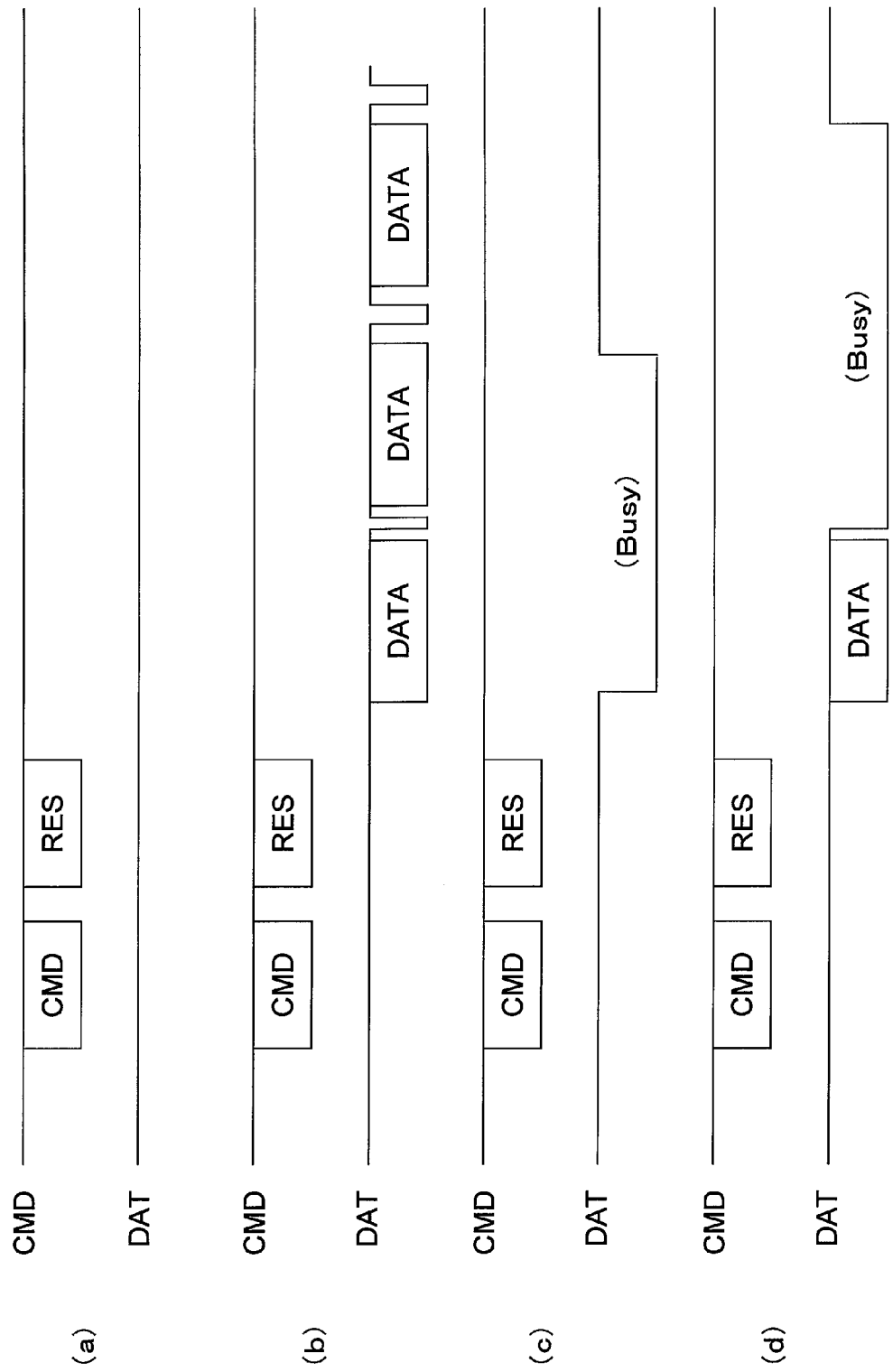
FIG. 2 is a diagram illustrating a transaction on a bus 3.

FIG. 2 is a diagram illustrating bus transactions between the memory device 1 and the host device 2 carried out via the bus 3 in the non-volatile storage system 1000.

In FIG. 2, command CMD is a signal sent by the host device 2 to the memory device 1 so as to instruct the reading and writing of data and so on.

Response RES is a signal sent by the memory device 1 that received a command CMD in order to return various types of status information and so on.

Data DAT is sent by the host device 2 to the memory device 1 when writing into the memory device 1, and is sent by the memory device 1 to the host device 2 when reading out from the memory device 1.

These transactions are primarily carried out through processing performed by the command processing unit 111 and the host IF unit 110 of the memory device 1 and the host controller 25 of the host device 2, but the memory control unit 112 of the memory device 1 may also perform processing as necessary.

Multiple types of bus transactions exist depending on the content of the command issued by the host device 2, but in FIG. 2(a), the transaction is completed using only the command CMD and the response RES. This is used primarily in the case of a command in which data is not inputted/outputted to/from the non-volatile memory 12.

In FIG. 2(b), data DATA transfer is also carried out, in addition to the command CMD and the response RES. This bus transaction is a bus transaction performed primarily in the case where data is written into the non-volatile memory 12 and data is read out from the non-volatile memory 12.

The bus transaction indicated in FIG. 2(c) is a bus transaction in which the memory device 1 sends, using the data signal DAT, a status signal Busy (Busy signal) to the host device 2 indicating that the memory device 1 is currently performing internal processing, in addition to the command CMD and the response RES.

The bus transaction indicated in FIG. 2(d) is a bus transaction in which the memory device 1 sends, to the host device 2, a status signal Busy (Busy signal) following the command CMD, the response RES, and the data DATA.

As shown in FIGS. 2(c) and (d), the status signal Busy (Busy signal) is sent by the memory device 1 so that the memory controller 11 can input/output data from/to the non-volatile memory 12 within the memory device 1, without inputting/outputting data from/to the host device 2. In such a case, with the non-volatile storage system 1000, the bus transactions indicated in FIGS. 2(c) and (d) are used.

<<Data Format>>

FIG. 3 is a diagram illustrating the structures of the command CMD, response RES, and data DAT exchanged between the memory device 1 and the host device 2.

In FIG. 3, CMD, RES, and DAT are all structured so as to include a starting bit, an ending bit, and a CRC in order to detect errors on the bus 3. CMD, RES, and DAT differ with respect to other structural elements.

CMD contains an identifier for identifying the processing content instructed by the host device 2, and an argument. The argument of CMD contains various control flags, address information for reading out data and writing data, and so on, and the content thereof differs depending on the identifier.

RES contains an identifier and status. The identifier of RES is the same value as the identifier of the command CMD issued by the host device 2. Meanwhile, status is a status signal indicating the internal status of the memory device 1, and contains, for example, information indicating the presence/absence of an error, status transitions of the memory device 1, and so on.

DAT contains a payload. The payload differs depending on the identifier of the command CMD issued by the host device 2; for example, in the case of a command to read out or write data from or to the non-volatile memory 12, the payload is the data read out from the non-volatile memory 12 or the data written into the non-volatile memory 12, whereas in the case of a register readout command, the payload is register values.

<<Memory Management Command>>

The memory device 1 and the host device 2 have functionality for processing at least one memory management command. FIG. 4 is a diagram indicating the structure of a memory management command.

The argument of the memory management command contains various control flags, including:
(1) real-time recording start and end flags ("start/end");
(2) a clear flag for the memory control information internal to the memory device 1 ("memory control information clear");
(3) a flag indicating whether or not auxiliary information is to be written when performing real-time recording ("auxiliary information recording ON/OFF"); and
(4) a garbage collection execute flag ("garbage collection").

When the memory device 1 identifies the timing at which to start/end real-time recording based on the "start/end" flag, the memory controller 11 updates settings in the register 1122, the address management unit 1123, and so on.

In the case where the "memory control information clear" flag has been set, or when it is known whether or not the host device 2 will write auxiliary information based on the state of the "auxiliary information recording ON/OFF" flag, the memory controller 11 updates the state of the memory control information holding unit, which will be mentioned later, thereby configuring a state in which real-time recording is possible.

When the "garbage collection" flag has been set, the memory controller 11 executes garbage collection, which will be mentioned later.

These control flags may each be one bit, or, for some sort of control purpose, may be structured of multiple bits. Furthermore, these control flags may, as indicated in FIG. 4(a), be allocated to arguments in different commands, or, as shown in FIG. 4(b), multiple control flags may be contained within the argument of a single command. Upon receiving a command, the memory device 1 executes the instructed process in accordance with the state of the flag contained in the argument.

Furthermore, it is possible to not set a control flag in the argument, and for the command itself to instruct the various controls, as shown in FIG. 4(c). For example, the memory device 1 can operate so as to automatically clear the memory control information and/or execute garbage collection upon receiving the command, regardless of the argument.

The transactions on the bus 3 when the command is processed by the memory device 1 and the host device 2 follow one of the transactions indicated earlier in FIGS. 2(a) to 2(d). When the memory device 1 receives a command and determines that a process for inputting/outputting data to/from the non-volatile memory 12 is necessary, the status signal Busy (Busy signal) is sent to the host device 2 while the input/output process is being performed, as shown in FIGS. 2(c) or (d).

1.2: Operation of Non-Volatile Storage System

Next, operations of the non-volatile storage system 1000 will be described with reference to the drawings.

(1.2.1: Real-Time Recording Sequence)

First, the real-time recording sequence of the non-volatile storage system 1000 will be described.

Figure 5:
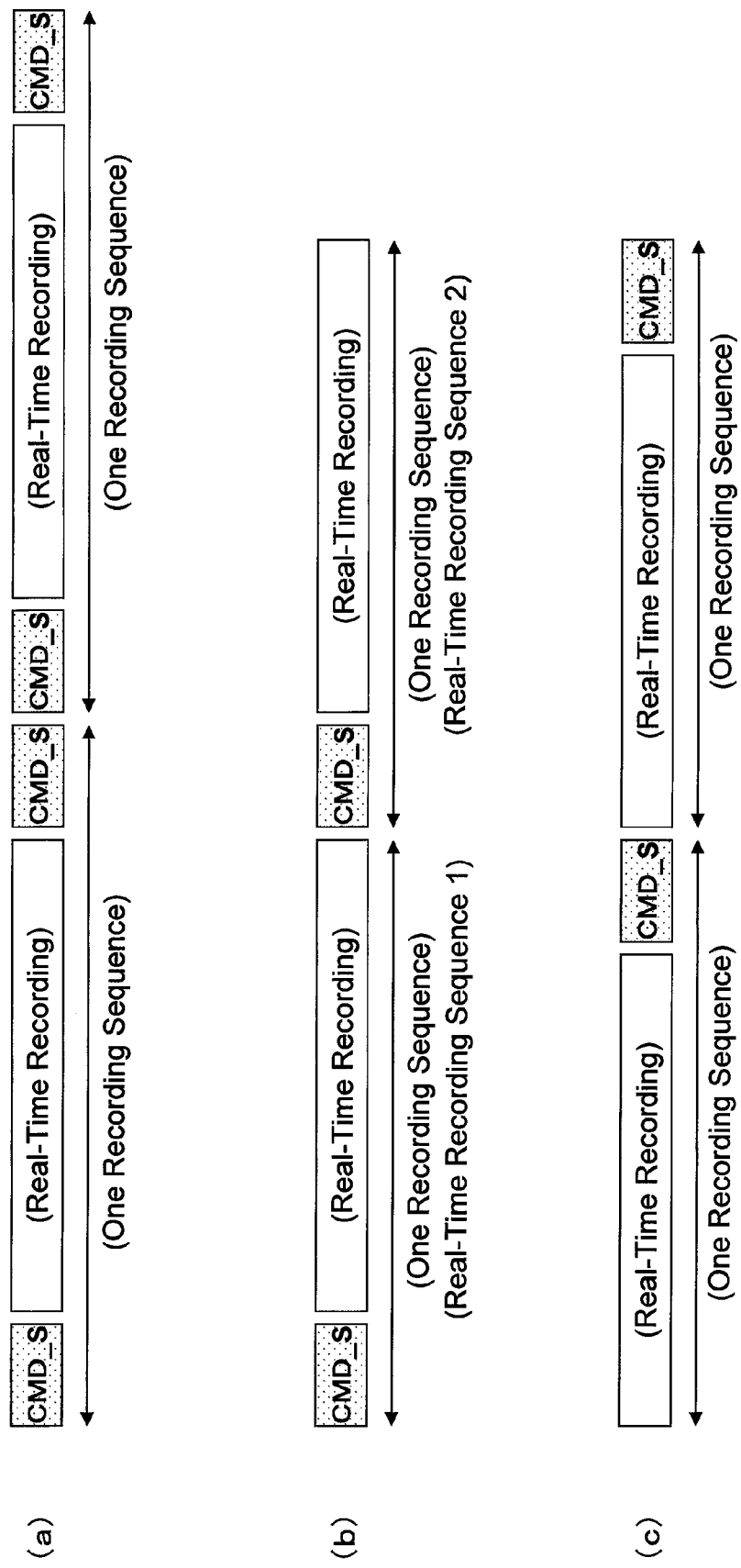
FIG. 5 is a diagram illustrating a sequence of real-time recording.

FIG. 5 is a diagram illustrating a sequence carried out in the non-volatile storage system (memory system) 1000 in which the host device 2 carries out real-time recording (a data writing process that ensures a constant write speed) into the memory device 1, according to the present embodiment.

In FIG. 5, CMD_S indicates the aforementioned memory management command.

As shown in FIG. 5, when the host device 2 carries out real-time recording into the memory device 1 in the non-volatile storage system 1000, one or more memory management commands are issued during a single recording sequence.

FIG. 5(a) indicates a real-time recording sequence in the case where the CMD_S is issued before the start and after the end of real-time recording.

FIG. 5(b) indicates a real-time recording sequence in the case where the CMD_S is issued before the start of real-time recording.

FIG. 5(c) indicates a real-time recording sequence in the case where the CMD_S is issued after the end of real-time recording.

Note that in FIG. 5, the CMD_S may be issued multiple times before the start and after the end of real-time recording. In such a case, the command identifiers, control flags of the arguments, and so on may be different for each of the multiple CMD_Ss that are issued. In addition, in FIG. 5, sequential real-time recording sequences may be executed by the same host device 2, or, in the case where the memory device 1 is removable from the host device 2, may be executed by different host devices 2. For example, both the real-time recording sequence 1 and the real-time recording sequence 2 indicated in FIG. 5(b) may be executed by the same host device 2, or the real-time recording sequence 1 may be executed by a certain host device (called a "host device A") and the real-time recording sequence 2 may then be executed by a host device B that is different from the host device A.

Figure 6:
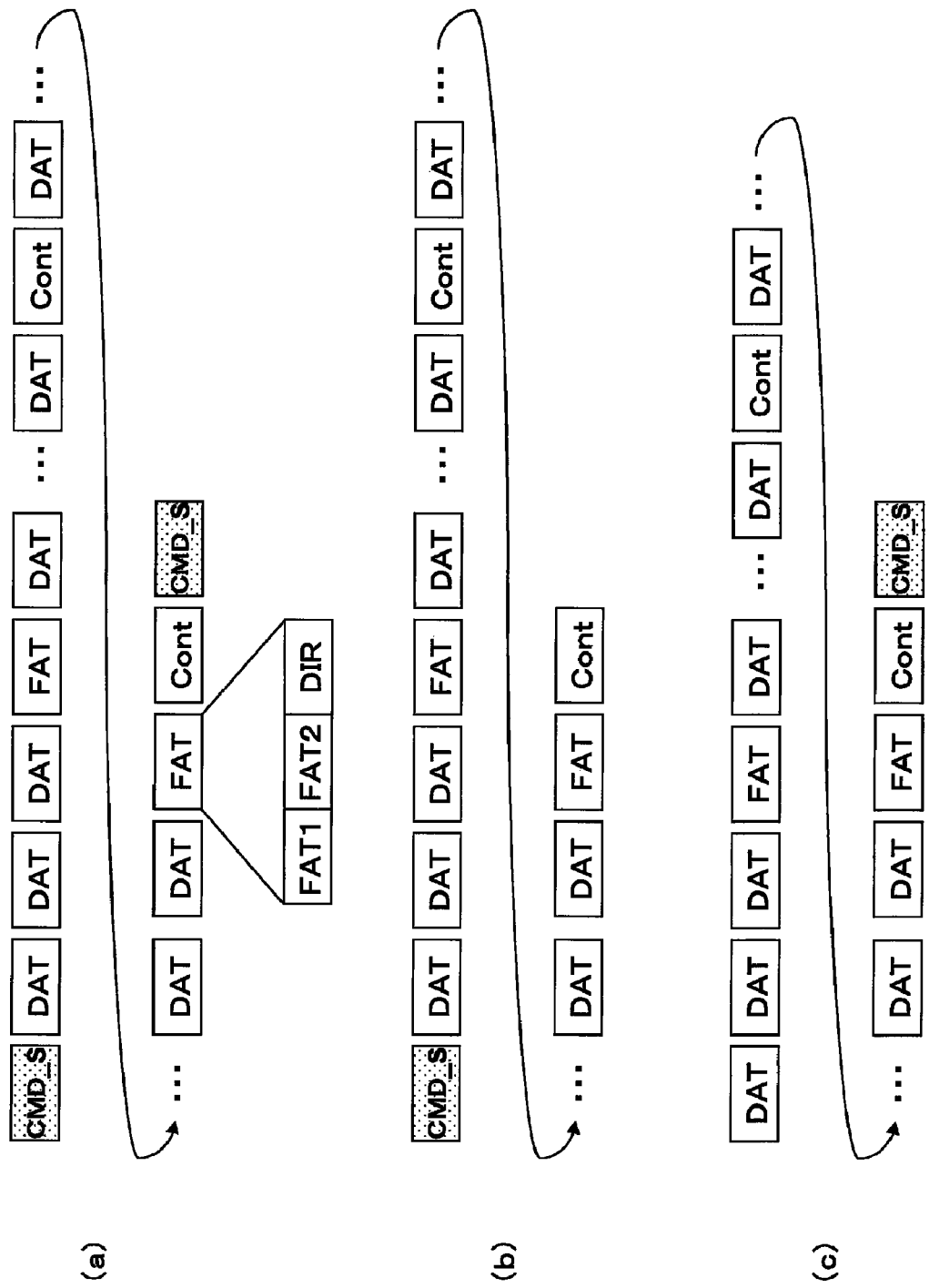
FIG. 6 is a diagram illustrating a sequence of real-time recording in the case where auxiliary information is present.
Figure 7:
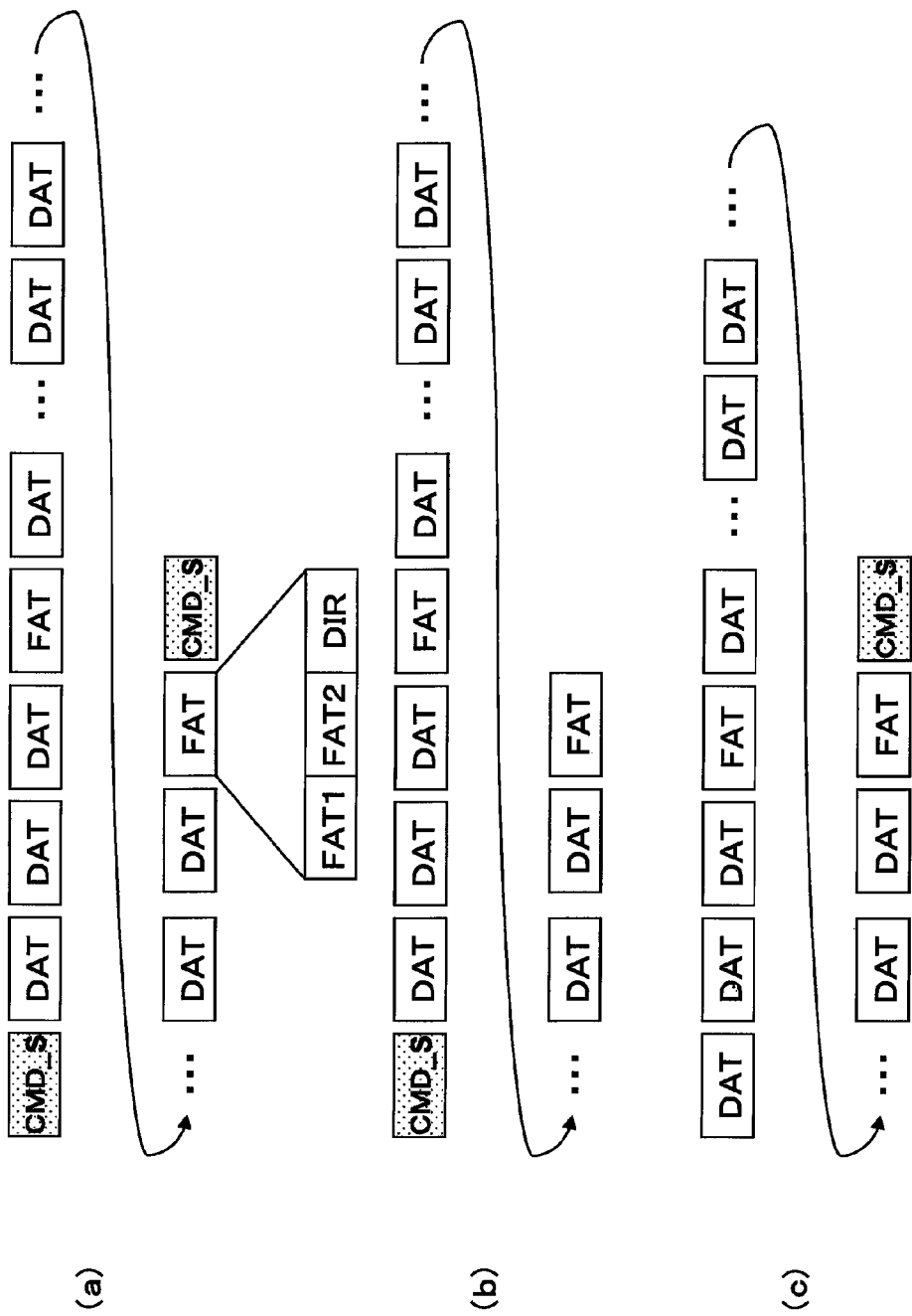
FIG. 7 is a diagram illustrating a sequence of real-time recording in the case where auxiliary information is not present.

FIG. 6 and FIG. 7 are diagrams illustrating more detailed real-time recording sequences; FIG. 6 and FIG. 7 schematically illustrate real-time recording sequences carried out in the non-volatile storage system 1000.

FIG. 6 and FIG. 7 differ in the following manner. That is, although FIG. 6 indicates a case in which the host device 2 writes auxiliary information Cont, FIG. 7 indicates a case in which the host device 2 does not write the auxiliary information Cont. Aside from that point, the case indicated in FIG. 6 and the case indicated in FIG. 7 are the same.

In FIG. 6 and FIG. 7, CMD_S, DAT, FAT, and Cont indicate the following items. In other words, (1) CMD_S indicates a bus transaction in which a memory management command is sent; for example, a bus transaction in which a memory management command (this is sometimes called a "memory management command CMD_S" hereinafter) is sent from the host device 2 to the memory device 1 and a response to the memory management command CMD_S is then sent from the memory device 1 to the host device 2 corresponds to this.

(2) DAT indicates a bus transaction in which a normal data writing process is performed; for example, a bus transaction in which a normal data writing process is performed based on a write command corresponds to this.

(3) FAT indicates a bus transaction in which a file management information writing process is performed; for example, a bus transaction in which a file management information writing process is performed based on a write command corresponds to this.

(4) Cont indicates a bus transaction in which an auxiliary information writing process is performed; for example, a bus transaction in which an auxiliary information writing process is performed based on a write command corresponds to this.

Note that the aforementioned bus transactions (1) through (4) may contain commands and responses, data transfers, and sending of status signal Busy. The types of data used in these bus transactions can be determined based on, for example, the size, address (logical address), and so on of the written data. Furthermore, other various methods can be employed in the non-volatile storage system 1000, such as adding information indicating the data type to the argument of the write command (the command sent from the host device 2 to the memory device 1), changing the command with each data type, or carrying out the actual process for writing the data after the host device 2 issues a command notifying the data type in advance to the memory device 1.

For example, in FIG. 6 and FIG. 7, FAT contains a writing process for the file allocation tables FAT1 and FAT2 as well as the directory entry DIR (a process for writing the file allocation tables FAT1, FAT2, and the directory entry DIR into the memory device 1 based on a write command sent from the host device 2 to the memory device 1); the memory controller 11 can identify FAT1 and FAT2 based on a writing address (a writing address specified by the write command sent from the host device 2 to the memory device 1 (logical address)), whereas DIR, Cont, and DAT can be identified by the size of the data to be written.

In addition, in the case where the size of the directory entry DIR and the size of the auxiliary information Cont are the same, the actual writing process may be executed after the host device 2 issues a command notifying the data type in advance to the memory device 1. For example, in the non-volatile storage system 1000, the host device 2 may issue, to the memory device 1, a command indicating that the data to be written thereafter is the auxiliary information Cont, prior to executing the process for writing the auxiliary information Cont. In addition, in the non-volatile storage system 1000, the host device 2 may issue, to the memory device 1, a command indicating that the data to be written thereafter is the directory entry DIR, prior to executing the process for writing the directory entry DIR.

Doing so makes it possible to properly carry out the directory entry DIR writing process and auxiliary information Cont writing process in the non-volatile storage system 1000, even in the case where the size of the directory entry DIR and the size of the auxiliary information Cont are the same.

In FIG. 6 and FIG. 7, (a), (b), and (c) respectively correspond to (a), (b), and (c) in FIG. 5, and indicate (a) the case where the host device 2 issues the CMD_S before the start and after the end of real-time recording;

(b) the case where the host device 2 issues the CMD_S before the start of real-time recording; and (c) the case where the host device 2 issues the CMD_S after the end of real-time recording.

<<Memory Control Information>>

In the case where real-time recording is carried out in the non-volatile storage system 1000, the memory controller 11 within the memory device 1 determines the type of the data written into the memory device 1 by the host device 2, and writes the data into different regions within the non-volatile memory 12 (different regions physically separated within the non-volatile memory 12). In addition, in the case where real-time recording is carried out in the non-volatile storage system 1000, the memory controller 11 internally holds information of the data type (the type of the data written into the non-volatile memory 12), writing regions within the non-volatile memory 12, and so on as memory control information, and updates this memory control information as appropriate as writes are made by the host device 2.

Figure 8:
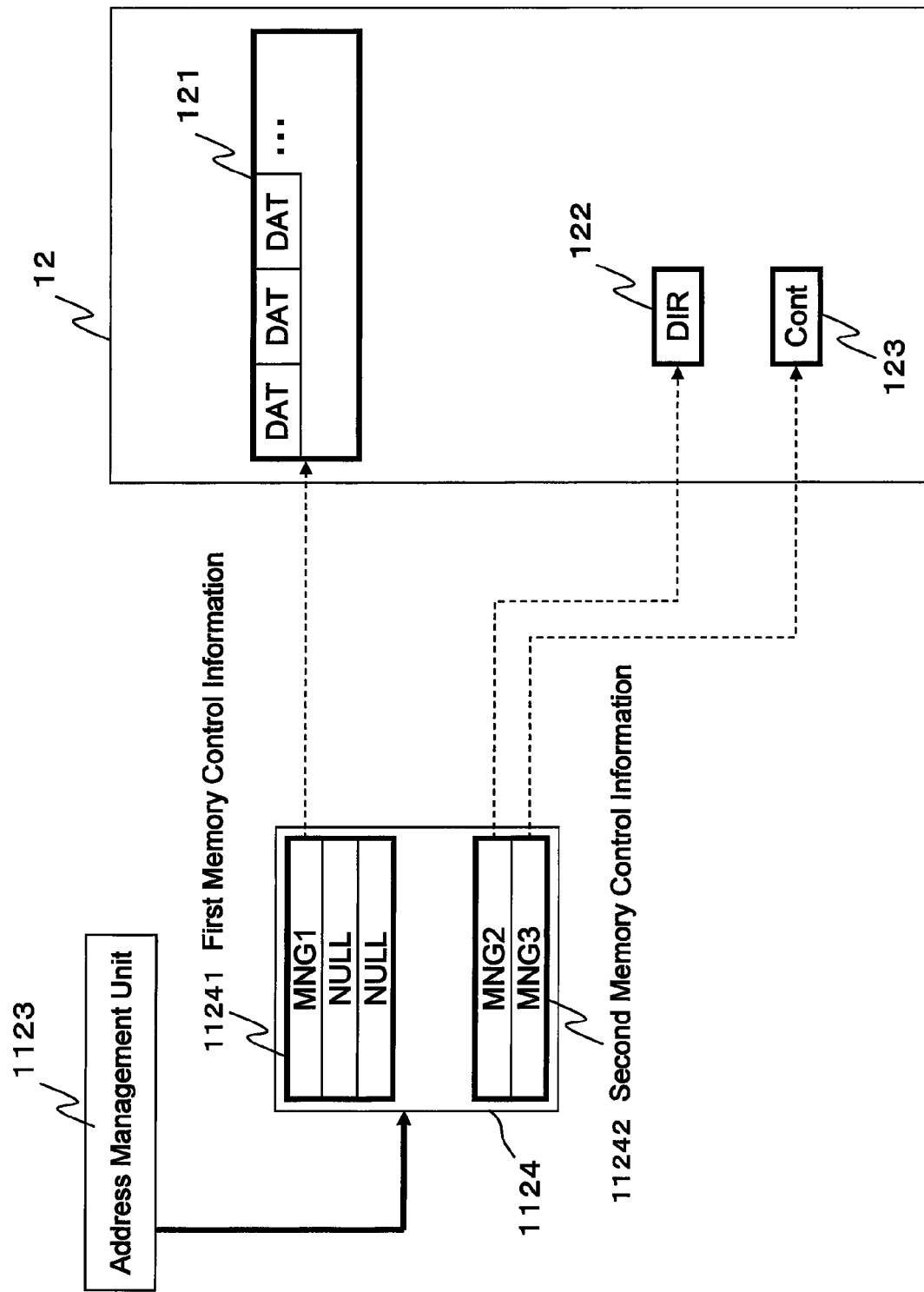
FIG. 8 is a diagram illustrating the state of a non-volatile memory and memory control information.

FIG. 8 is a diagram illustrating the state of writing regions within the non-volatile memory 12 and the state of the memory control information holding unit 1124 held by the memory controller 11.

As shown in FIG. 8, in the case where data is written into the non-volatile memory 12, the memory controller 11 identifies the normal data DAT, the directory entry DIR, and the auxiliary information Cont, and writes the normal data DAT into the region 121, the directory entry DIR into the region 122, and the auxiliary information Cont into the region 123. In addition, in order to manage the types of data written and the writing regions, the address management unit 1123 holds, within the memory control information holding unit 1124, the memory control information of the normal data DAT as first memory control information 11241, and holds the memory control information of the directory entry DIR and the auxiliary information Cont as second memory control information 11242. In other words, in the non-volatile storage system 1000 according to the present embodiment, the memory controller 11 distinguishes the normal data DAT as a first type of data, and the directory entry DIR and the auxiliary information Cont as a second type of data.

Here, a single piece of memory control information regarding the normal data DAT, the directory entry DIR, and the auxiliary information Cont may be used for each data type, or multiple pieces of memory control information may be held for each data type. FIG. 8 illustrates a case in which multiple pieces of the first memory control information can be held (in the case showed in FIG. 8, three pieces of the first memory control information are held), whereas with respect to the second memory control information, a single piece of memory control information can be held for the directory entry DIR, and a single piece of memory control information can be held for the auxiliary information Cont.

Note that the reason for managing the normal data DAT as the first memory control information and managing the directory entry DIR and the auxiliary information Cont as the second memory control information is as follows. That is, in the non-volatile storage system 1000, the normal data DAT is sequentially written into sequential regions (regions in which the logical addresses within the logical address space managed by the host device 2 are sequential) in units of a comparatively large data size (several tens of KB to several hundred KB), whereas the directory entry DIR and auxiliary information Cont are repeatedly overwritten in the same region (a region in which the logical address within the logical address space managed by the host device 2 is the same) at comparatively smaller sizes (several hundred B to several KB); the aforementioned management takes these differences into consideration in order to achieve real-time recording in the non-volatile storage system 1000.

FIG. 9 is a diagram illustrating the details of the aforementioned first memory control information 11241 and second memory control information 11242, and illustrates an example of memory control information MNG1 of the normal data DAT.

As shown in FIG. 9, the memory control information MNG1 is structured so as to include a data type, a logical address LBA, a physical address PBA, and other management information.

The data type is information indicating the type of the data that has been written, and in this case, denotes "normal data".

The logical address LBA is an address (logical address) specified by the host device 2 as a write address, and the unit thereof is the byte, word, sector, or the like.

The physical address PBA is the physical address of the region 121 in the non-volatile memory 12 into which data is written, and the unit thereof the byte, page, block, or the like.

The other management information is information necessary for the memory controller 11 to control the state of the non-volatile memory 12, and includes, for example, the number of rewrites of a physical block within the region 121, the valid data size within a physical block, the presence/absence of unrecoverable errors in the data held in the non-volatile memory, whether or not garbage collection is necessary, and the like.

Note that the information contained within the first memory control information and the second memory control information may be the same (may be the same format), or may be different (may be different formats).

Note that in FIG. 8, the directory entry DIR and the auxiliary information Cont are handled as the same second type data, but, for example, the memory control information can also be controlled separately, whereby the directory entry DIR is taken as the second type and the auxiliary information Cont is taken as a third type; the details disclosed in the present invention are applicable in such a case as well.

(1.2.2: Processing of Memory Management Commands)

Next, the processing of memory management commands in the non-volatile storage system 1000 will be described.

Figure 10:
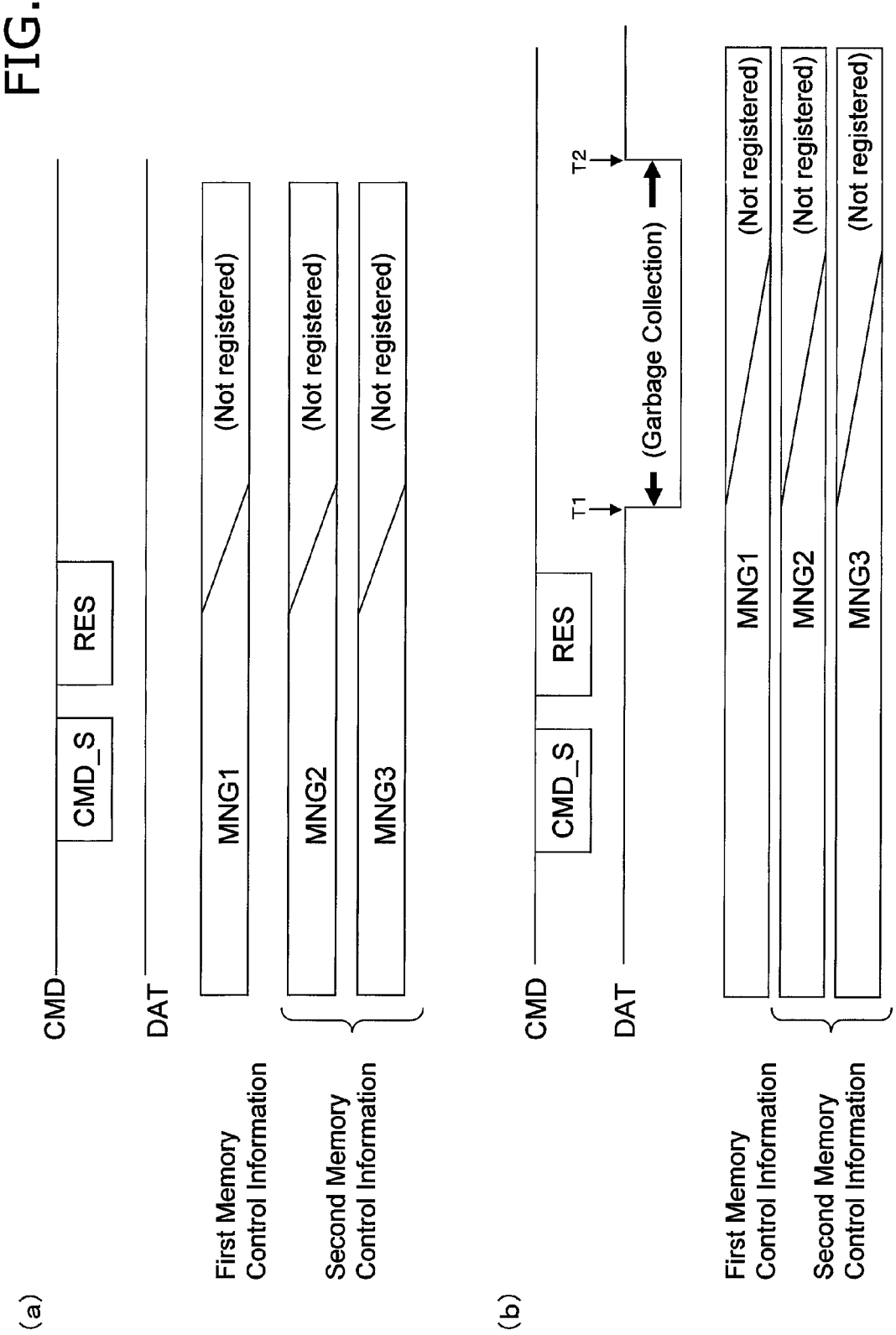
FIG. 10 is a diagram illustrating operations performed by a memory device upon receiving a memory management command.

FIG. 10 is a diagram illustrating processing performed by the memory controller 11 in the case where the memory device 1 has received the aforementioned memory management command from the host device 2 in the non-volatile storage system 1000.

In FIG. 10(*a*), upon receiving a memory management command CMD_S issued by the host device 2, the memory device 1 sends a response RES to the host device 2, and the address management unit 1123 within the memory controller 11 clears the first memory control information and the second memory control information held within the memory control information holding unit 1124, setting the state thereof to "not registered".

Meanwhile, in FIG. 10(*b*), upon receiving a memory management command CMD_S issued by the host device 2, the memory device 1 sends a response RES to the host device 2; meanwhile, the address management unit 1123 clears the first memory control information and the second memory control information held by the memory control information holding unit 1124, setting the state thereof to "not registered", and carries out garbage collection for the non-volatile memory 12. During this time (the period from a time T1 to a time T2 indicated in FIG. 10(*b*)), the memory device 1 outputs a status signal Busy (Busy signal) on the signal line DAT to the host device 2, and terminates the output of the Busy signal when the garbage collection is complete. Here, garbage collection includes a process for copying only the valid data from the regions managed by the first memory control information and the second memory control information (the regions 121, 122, and 123 in the non-volatile memory 12, indicated in FIG. 8) into another region within the non-volatile memory 12, and then clearing the regions managed by the first memory control information and the second memory control information.

Note that in the garbage collection, both the aforementioned valid data copying and clearing may be performed for regions not managed by the first and second memory control information as well, or the valid data may simply be copied without clearing.

Note that in the examples indicated in FIGS. 10(*a*) and (*b*), in the case where the memory device 1 has received a memory management command from the host device 2, the memory controller 11 may alternatively clear only the second memory control information, thereby setting the state thereof to "not registered".

In this manner, with the non-volatile storage system 1000 according to the present embodiment, the host device 2 issues a memory management command to the memory device 1 before the beginning, after the end, or both before the beginning and after the end of real-time recording, and upon receiving the memory management command, the memory device 1 clears the information held in the memory control information holding unit 1124, setting the state thereof to "not registered", and performs garbage collection as necessary.

Through this, with the non-volatile storage system 1000, the memory controller 11 can register new memory control information in the memory control information holding unit 1124 based on the data type with each writing process, even in the case where real-time recording is performed and a writing process for normal data and a writing process for file management information and auxiliary information are carried out in an alternating manner. As a result, with the non-volatile storage system 1000, data or information of different data types are not written into predetermined regions of the non-volatile memory 12 in a mixed state, thereby making it possible to properly control writes into the non-volatile memory 12, and making stable real-time recording possible.

Although a non-volatile storage system according to the first embodiment has been described using the drawings, the scope of the present invention is not intended to be limited thereto; for example, the host device can also issue a memory management command to the memory device at an arbitrary timing. In such a case, if the memory device is made to carry out garbage collection upon receiving the memory management command from the host device, the writing performance of the data that follows thereafter can be improved.

In addition, the memory device may be a removable memory card, or may be an embedded device attached directly to the circuit board of the host device.

Furthermore, the non-volatile memory is not intended to be limited to a flash memory, and the present invention can be applied even in the case where another non-volatile memory, such as a hard disk, a non-volatile RAM, or the like is used.

Other Embodiment

Each block of the non-volatile storage device, the host device and the memory device in each of the above embodiments may be formed using a single chip with a semiconductor device, such as LSI (large-scale integration), or some or all of the blocks of the non-volatile storage device, the host device and the memory device may be formed using a single chip. Although LSI is used as the semiconductor device technology, the technology may be IC (integrated circuit), system LSI, super LSI, or ultra LSI depending on the degree of integration of the circuit.

The circuit integration technology employed should not be limited to LSI, but the circuit integration may be achieved using a dedicated circuit or a general-purpose processor.

A field programmable gate array (FPGA), which is an LSI circuit programmable after manufactured, or a reconfigurable processor, which is an LSI circuit in which internal circuit cells are reconfigurable or more specifically the internal circuit cells can be reconnected or reset, may be used.

Further, if any circuit integration technology that can replace LSI emerges as an advancement of the semiconductor technology or as a derivative of the semiconductor technology, the technology may be used to integrate the functional blocks of the non-volatile storage device, the host device and/or the memory device. Biotechnology is potentially applicable.

The processes described in the above embodiments may be achieved using either hardware or software, or may be achieved using both software and hardware.

When the non-volatile storage device, the host device and/or the memory device of each of the above embodiments is implemented by hardware, the non-volatile storage device, the host device and/or the memory device requires timing adjustment for each of its processes.

For ease of explanation, timing adjustment associated with various signals required in an actual hardware design is not described in detail in the above embodiments. The specific structures described in the above embodiments are mere examples of the present invention, and may be changed and modified variously without departing from the scope and spirit of the invention.

INDUSTRIAL APPLICABILITY

According to the present invention, it is possible to provide a memory controller, memory device, host device, and memory system capable of real-time recording, and the present invention is particularly useful in a host device such as a video camera, digital camera, or cellular phone that records moving pictures into a large-capacity non-volatile memory and a memory device that includes a non-volatile memory such as a removable memory card, an embedded device, or the like.

EXPLANATION OF REFERENCE

1000 non-volatile storage system
1 memory device (non-volatile storage device)
11 memory controller
110 host IF unit
111 command processing unit
112 memory control unit
1121 CPU
1122 register
1123 address management unit
1124 memory control information holding unit
113 data control unit
12 non-volatile memory
2 host device
21 CPU
22 ROM
23 RAM
24 buffer RAM
25 host controller
3 bus

The invention claimed is:

1. A non-volatile storage device, communicably connected to a host device, that writes data in accordance with a command from the host device, the non-volatile storage device comprising:
a non-volatile memory; and
a memory control unit that, when a memory management command issued by the host device instructing the start of real-time recording, the real-time recording being a data writing process that ensures a constant writing speed, is received, performs a garbage collection process for the non-volatile memory, and then distinguishes between the data to be continuously written into a first memory region within the non-volatile memory as a first data type and the data written into a second memory region within the non-volatile memory as a second data type.

2. The non-volatile storage device according to claim 1, wherein the memory control unit identifies file data as the first data type and identifies file management information as the second data type.

3. The non-volatile storage device according to claim 2, wherein the memory control unit identifies at least one of directory entries or auxiliary information as the second data type.

4. The non-volatile storage device according to claim 1, wherein the memory control unit identifies the data type by the write address of the data.

5. The non-volatile storage device according to claim 1, wherein the memory control unit identifies a directory entry contained in the second data type by the size of the written data and a command issued by the host device.

6. The non-volatile storage device according to claim 1, wherein the memory management command contains an argument; and
the argument of the memory management command contains a flag indicating the start of real-time writing.

7. The non-volatile storage device according to claim 1, wherein when the memory management command is received, a busy signal is communicated to the host device until processing in the non-volatile storage device has ended.

8. The non-volatile storage device according to claim 1, wherein the non-volatile storage device is a removable memory that can be attached to or removed from the host device.

9. The non-volatile storage device according to claim 1, wherein the memory control unit identifies a directory entry contained in the second data type by a command issued by the host device.

10. A data recording method used in a non-volatile storage device, communicably connected to a host device, that writes data in accordance with a command from the host device, the non-volatile storage device comprising:
a non-volatile memory;
the data recording method including:
when a memory management command issued by the host device instructing the start of real-time recording, the real-time recording being a data writing process that ensures a constant writing speed, is received, performing a garbage collection process for the non-volatile memory, and then distinguishing between the data to be continuously written by into a first memory region within the non-volatile memory as a first data type and the data written into a second memory region within the non-volatile memory as a second data type; and
recording the data of the first data type into the first memory region within the non-volatile memory, and recording the data of the second data type into the second memory region within the non-volatile memory.

* * * * *

UNITED STATES PATENT AND TRADEMARK OFFICE
CERTIFICATE OF CORRECTION

| | | |
|---|---|---|
| PATENT NO. | : 8,266,371 B2 | |
| APPLICATION NO. | : 12/670454 | |
| DATED | : September 11, 2012 | |
| INVENTOR(S) | : Masayuki Toyama | |

It is certified that error appears in the above-identified patent and that said Letters Patent is hereby corrected as shown below:

In the claims:

Column 18, in claim 10, line 28, "continuously written by into" should read
-- continuously written into --.

Signed and Sealed this
Twenty-seventh Day of November, 2012

David J. Kappos
*Director of the United States Patent and Trademark Office*